UNITED STATES PATENT OFFICE.

JÜRGEN CALLSEN, OF ELBERFELD, GERMANY, ASSIGNOR TO FARBENFABRIKEN VORM. FRIEDR. BAYER & CO., OF ELBERFELD, GERMANY, A CORPORATION OF GERMANY.

ALKYLALKOXYMETHYL ESTERS OF CRESOTINIC ACIDS.

1,088,966.  Specification of Letters Patent.  Patented Mar. 3, 1914.

No Drawing.  Application filed June 17, 1913. Serial No. 774,124.

*To all whom it may concern:*

Be it known that I, JÜRGEN CALLSEN, doctor of philosophy, chemist, citizen of the German Empire, residing at Elberfeld, Germany, have invented new and useful Improvements in Alkylalkoxymethyl Esters of Cresotinic Acids, of which the following is a specification.

My invention relates to the production of new pharmaceutical products which are chemically alkylalkoxymethyl esters of cresotinic acids having the following general formula:

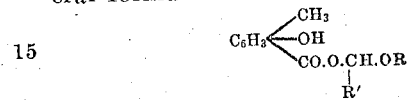

(R and R' meaning alkyl radicals, such as methyl, ethyl, propyl or the like) and which, according to my researches, possess valuable therapeutic properties, being good remedies against rheumatism, an average dose being between three and ten grains for external application.

The process for producing my new compounds consists in treating salts of cresotinic acids with alpha-halogen-dialkylethers having the following general formula:

(X meaning a halogen atom, R and R' meaning either the same or two different alkyl radicals).

The new products are from colorless to yellowish liquids soluble in ether, alcohol, chloroform and benzene. Their alcoholic solutions are colored violet by ferric chlorid.

In carrying out my new process practically I can proceed as follows, the parts being by weight:—10.85 parts of alpha-monochlorodiethylether having the formula:

(see *Annalen der Chemie* vol. 108, p. 226) are added little by little to 19 parts of the dry sodium salt of para-cresotinic acid, while carefully cooling. After the reaction is completed, the mixture is washed with ice water and a dilute solution of sodium carbonate in order to remove the sodium chlorid and the excess of methyl-salicylic acid, contained therein, and subsequently dried over chlorid of calcium.

The new methylethoxymethyl cresotinate of the formula:

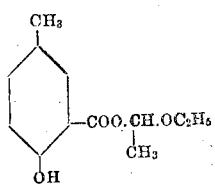

is a yellowish oil having a faint aromatic odor. When treated with water, dilute acids or alkalis, it breaks up into para-cresotinic acid, acetaldehyde and ethylalcohol.

The process proceeds in an analogous manner, if other alpha-halogendialkylethers, such as alpha-monochloroethylmethylether, alpha-monochloroamylmethylether or the like, are employed. Of course, other cresotinic acids, such as ortho- or meta-acid can also be used.

I claim:—

1. The herein described new alkylalkoxymethyl esters of cresotinic acids of the following general formula:

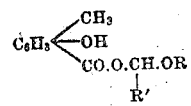

R and R' meaning alkyl radicals, being from colorless to yellowish liquids soluble in ether, alcohol, chloroform and benzene, the alcoholic solutions being colored violet by ferric chlorid and exhibiting valuable therapeutic properties, substantially as described.

2. The herein described new methylethoxymethyl ester of para-cresotinic acid of the following formula:

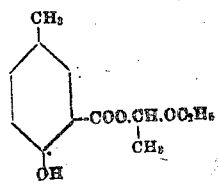

being a yellowish oil, breaking up into cresotinic acid, acetaldehyde and ethylalcohol when reacted upon by dilute acids, and exhibiting valuable therapeutic properties, substantially as described.

In testimony whereof I have hereunto set my hand in the presence of two subscribing witnesses.

JÜRGEN CALLSEN. [L. S.]

Witnesses:
 HELEN NUFER,
 ALBERT NUFER.